Dec. 1, 1953 C. BOSCH 2,661,456
MEASURING INSTRUMENT WITH ELECTROSTATIC RETURN TORQUE
Filed Dec. 1, 1949 2 Sheets-Sheet 1
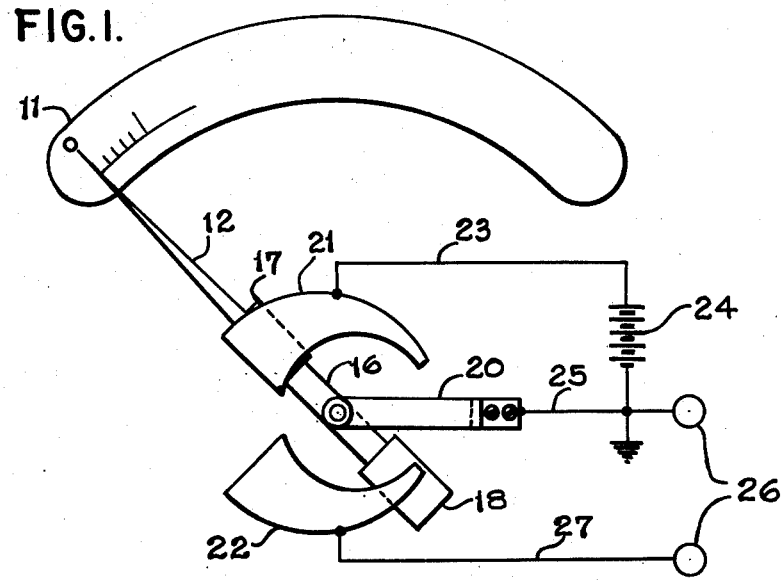
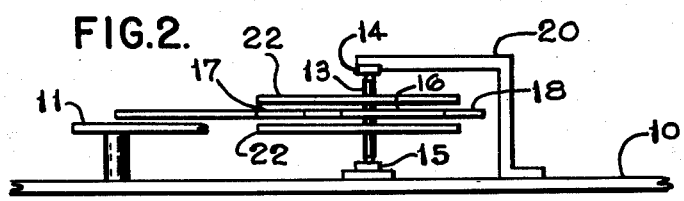
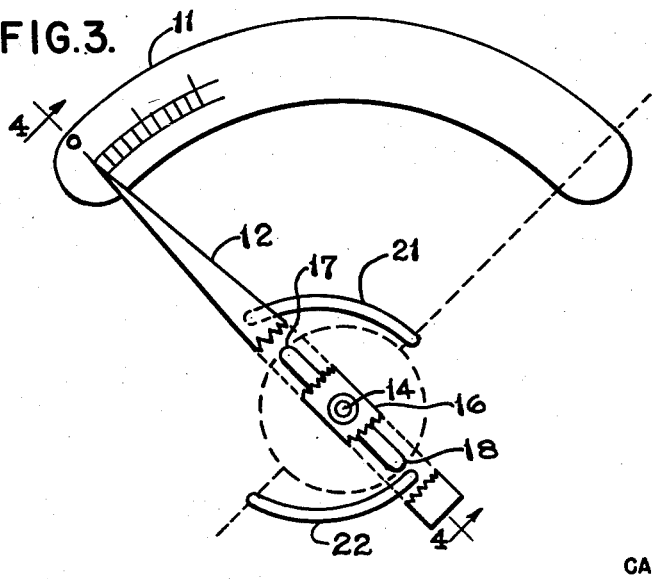
INVENTOR.
CARL BOSCH
BY Ralph E. Bitner
ATTORNEY Dec. 1, 1953    C. BOSCH    2,661,456
MEASURING INSTRUMENT WITH ELECTROSTATIC RETURN TORQUE
Filed Dec. 1, 1949    2 Sheets-Sheet 2
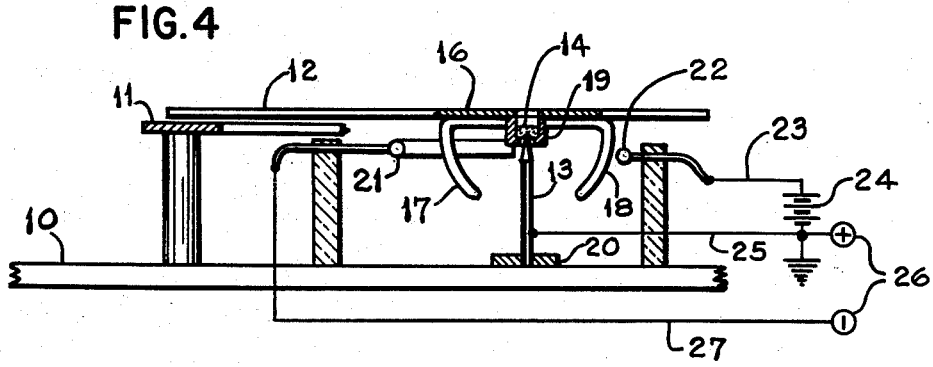
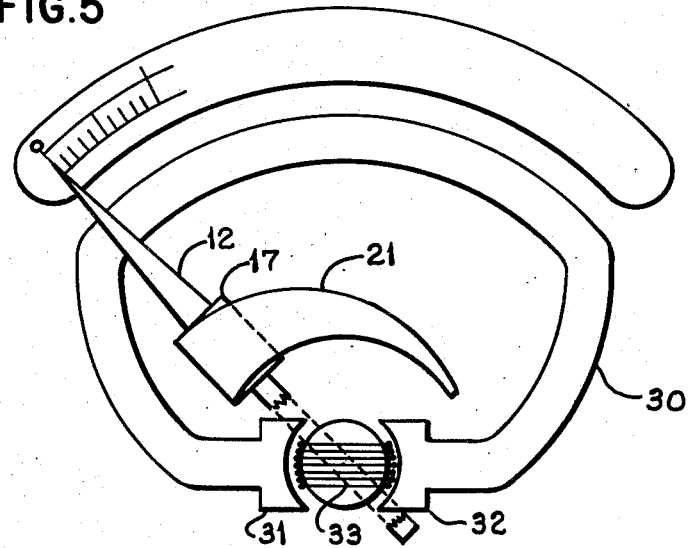
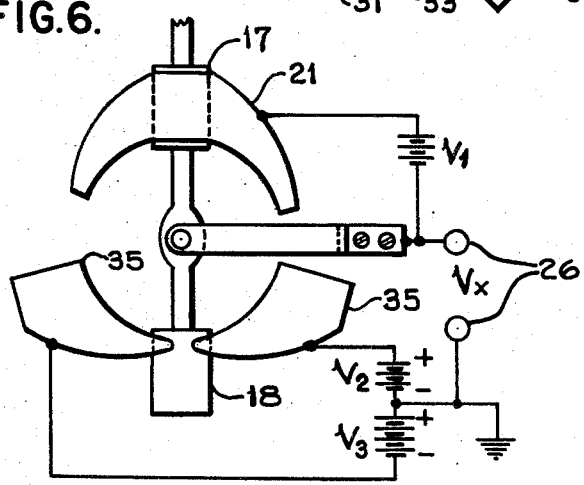
INVENTOR.
CARL BOSCH
BY Ralph E. Bitner
ATTORNEY

Patented Dec. 1, 1953

2,661,456

UNITED STATES PATENT OFFICE 2,661,456

MEASURING INSTRUMENT WITH ELECTROSTATIC RETURN TORQUE

Carl Bosch, Arlington, N. J., assignor to Chatham Electronics Corporation, Newark, N. J., a corporation of New Jersey Application December 1, 1949, Serial No. 130,468

1 Claim. (Cl. 324—109)

This invention relates to measuring instruments and has particular reference to pivot instruments which require a variable return force for their moving systems.

Practically all of the voltmeters, ammeters, and wattmeters in use today use one or two spiral springs to furnish the return force for the moving systems. The return force controls the pointer to read zero when no current or voltage is applied to the instrument and opposes the applied force when a reading is being taken. A few galvanometers use a single or bifilar type of suspension and there exist a small number of magnetic fluxmeters which have no return force at all; however, the great majority use spring controlled moving systems because, when carefully adjusted, the spring produces a convenient means of construction and generally furnishes an instrument with a linear scale.

In spite of their convenience, the springs present a difficult problem since they are hard to make and difficult to adjust. Considerable time must be spent in testing the calibration of the instrument and adjusting the spring mounting to give the correct amount of elastic force.

One of the objects of this invention is to provide an improved return force system for indicating instruments which avoids one or more of the disadvantages and limitations of prior art systems.

Another object of the invention is to provide a structure for producing a return force which may be made easily and to close tolerances.

Another object of the invention is to provide a return force system which can be easily designed to give a linear scale, a squared scale, an inverse squared scale, or almost any other type of scale that can be used in measuring electrical quantities.

Another object of the invention is to provide a return force system which is adaptable to a changed sensitivity within wide limits.

Another object of the invention is to provide a return force system which can be used in any kind of measuring system having a moving mechanical system for indicating the value of the measured quantity.

The invention comprises an electrostatic return force system for use on indicating measuring instruments, and includes one or more movable conductors secured to the moving indicating system of the instrument. One or more cooperating stator conductors form a variable capacitor and a steady known source of potential is applied between the movable conductor and the stator conductor to create an attractive force acting to turn the moving system towards a zero position.

For a better understanding of the present invention, together with other and further objects thereof, reference is made to the following description taken in connection with the accompanying drawings.

Fig. 1 is a plan view of an electrostatic voltmeter, partly schematic, showing how the invention may be used on this type of instrument.

Fig. 2 is a side view of the structure shown in Fig. 1.

Fig. 3 is a plan view of another and simpler form of voltmeter arranged with a single pivot.

Fig. 4 is a cross sectional view taken along line 4—4 of Fig. 3.

Fig. 5 is a plan view of a meter having a magnetic system with a moving coil for the indicating means and an electrostatic system for the return force.

Fig. 6 is a plan view of an arrangement of capacitor plates and connected potential sources to show how a zero-centered electrostatic voltmeter can be constructed.

Referring now to Figs. 1 and 2, the electrostatic voltmeter comprises a base 10, and a calibrated scale 11, which indicates voltage values in cooperation with a moving pointer 12. The moving system includes a shatf 13 which is rotatably mounted between two bearings 14 and 15. On the shaft 13 is mounted a supporting rod 16, two conductive plates 17 and 18, and the pointer 12. A suitable bracket 20 is used to hold the top bearing 14 in place.

In order to form capacitors with the conductive plates 17 and 18 four stator plates are secured to the base and are positioned above and below the moving plates, separated by a small air gap. One stator plate for each moving plate is sufficient, but two plates increases the sensitivity and permits a small tolerance of motion in a vertical direction for the movable plates. Stator plates 21 are mounted above and below moving plate 17 and stator plates 22 are above and below moving plate 18.

Electrical connections are made to each pair of stator plates and to the bracket 20. Conductor 23 connects stator plates 21 with a constant source of potential 24 which may be mounted in the instrument case or on the outside in a separate container. Bracket 20 and the two movable plates are connected to ground and to the other side of the source of potential 24 by conductor 25.

The voltage to be measured is connected to terminals 26, the lower terminal being connected to stator plates 22 by conductor 27.

The return force which tends to move the moving system to a zero position is furnished by the source of potential 24 and the capacitor which is made up of plates 17 and 21. The stator plates 21 are formed so that the capacity is decreased as the moving system moves away from its zero position. Then when voltage is applied to capacitor 17, 21, the movable plate tends to move to a position where the capacity is the greatest. The force which tends to return the moving system toward a zero position depends upon the rate at which the capacity decreases. For this reason the shape of the plates 21 not only determines the force, but also the manner in which the force varies in different parts of the scale.

An electrostatic voltmeter constructed with the usual spring for the return force and a capacitor plate system which increases the capacity in direct proportion to the angular displacement results in an inconvenient scale, insensitive in the lower voltage range and increasing in sensitivity as the higher voltages are measured. The present invention furnishes a solution to the non-linear scale problem and permits a linear scale. The electrostatic characteristics which cause the non-linear scale in present instruments are presented in a reverse manner by the restoring force system and the result is a linear scale. Other scales such as logarithmic, reciprocal, etc., may be attained by properly shaping the plates of both capacitors.

The electrostatic voltmeter shown in Figs. 3 and 4 is similar to the design described above but uses simple rod type conductors instead of plates, and is naturally less sensitive. In this type of instrument, a single pivot point on shaft 13 engages a conductive bearing 14 which is enclosed in a housing 19 and supports the entire moving system. Instead of moving plates, conductors 17 and 18 are the moving components which form the variable capacitors with conductors 21 and 22. Capacitor 18, 22 is used for the restoring force since it has maximum capacity at the zero reading. Capacitor 17, 21 is connected to terminals 26 where an unknown voltage can be applied.

The moving conductors 17 and 18 are formed in a circular manner with the center of the circular arcs at the pivot point. Then a small deviation from the horizontal position will have no effect on the capacity of the conductors.

The arrangement shown in Fig. 5 is a combination moving coil measuring instrument with an electrostatic return force system. No springs are necessary. A magnet 30, terminated by shoes 31 and 32, furnishes the magnetic lines of force necessary for the moving coil 33 which is attached to the pointer 12. A movable plate 17 is also secured to the moving system and moves between stator plates 21 to form a variable capacitor in the same manner as the components in Figs. 1 and 2.

The operation of the instrument shown in Fig. 5 is similar to the previously described instruments. The turning force is supplied by current in coil 33 in a steady magnetic field. The opposite or return force is supplied by the variable capacitor 17, 21, the capacity of which decreases as the moving system is rotated from a zero position.

The arrangement shown in Fig. 6 indicates the capacitors and potential sources which can be used in a zero center electrostatic voltmeter which shows polarity. The upper moving plate 17 cooperates with stator plates 21 to return the moving system to a central zero position. The lower stator plates 34 and 35 must be given equal but opposite potentials by batteries $V_2$ and $V_3$ to differentiate between a positive and a negative potential. The unknown voltage $V_x$ is applied to terminals 26, one of which may be grounded. If the lower movable plate 18 is made positive, the moving system will move in a clockwise direction since the plate 18 is attracted by stator plate 34 and repulsed by stator plate 35.

From the above description it will be evident that the invention provides a static return force for indicating instruments which is a flexible and useful device. It dispenses with springs and serves to counteract the non-linear characteristic of electrostatic voltmeters.

While there have been described and illustrated specific embodiments of the invention, it will be obvious that various changes and modifications may be made therein without departing from the field of the invention which should be limited only by the scope of the appended claim.

I claim:

An electrostatic return force system for electrostatic voltmeters comprising, a pivoted moving system for indicating the polarity and value of a potential difference, a first conductor secured to the moving system, two stator conductors adjacent to the first conductor to form a double capacitor which increases in capacity as the moving system is turned in either direction from a zero position, means for applying a known potential between the two stator conductors, said potential supplied by an equally divided source with its center point connected to a ground terminal, a second conductor secured to the moving system, a stator conductor adjacent to the second conductor to form a second capacitor which decreases in capacity as the moving system is turned in either direction from a zero position, means for applying an unknown potential between the ground terminal and the first conductor to indicate the polarity and value of said unknown potential, and means for applying a known potential to the second capacitor to create a return force acting to turn the moving system toward a zero position.

CARL BOSCH.

References Cited in the file of this patent

UNITED STATES PATENTS

| Number | Name | Date |
|---|---|---|
| 554,275 | Kelly | Feb. 11, 1896 |
| 810,330 | Evershed | Jan. 16, 1906 |

FOREIGN PATENTS

| Number | Country | Date |
|---|---|---|
| 363,645 | Great Britain | Dec. 21, 1931 |
| 390,075 | Great Britain | Aug. 17, 1933 |